United States Patent [19]

Freedman

[11] 4,167,737

[45] Sep. 11, 1979

[54] HYBRID PULSE COMPRESSION SYSTEM

[75] Inventor: Nathan Freedman, West Newton, Mass.

[73] Assignee: Raytheon Company, Lexington, Mass.

[21] Appl. No.: 868,107

[22] Filed: Jan. 9, 1978

[51] Int. Cl.² ............................................ G01S 9/233
[52] U.S. Cl. ............................................. 343/17.2 PC
[58] Field of Search ................................. 343/17.2 PC

[56] References Cited

U.S. PATENT DOCUMENTS

| | | | |
|---|---|---|---|
| 3,090,953 | 5/1963 | Frank | 343/17.2 PC X |
| 3,371,343 | 2/1968 | Sones | 343/17.2 PC |
| 3,573,819 | 4/1971 | Mason et al. | 343/17.2 PC X |
| 3,747,099 | 7/1973 | Wong | 343/17.2 PC |
| 3,889,199 | 6/1975 | Gutleber | 343/17.2 PC X |
| 4,005,417 | 1/1977 | Collins | 343/17.2 PC X |

*Primary Examiner*—Malcolm F. Hubler
*Attorney, Agent, or Firm*—David M. Warren; Joseph D. Pannone; Milton D. Bartlett

[57] ABSTRACT

A code generation and receiving system for a large bandwidth Doppler tolerant signal for use by communication and radar systems includes a set of delay lines for producing discrete phase shifts on a carrier signal. One delay line with relatively large delays between taps thereon produces a set of quadratic phase shifts approximating a frequency sweep. A second delay line with relatively small delays between taps thereon produces a binary phase code.

5 Claims, 3 Drawing Figures

HYBRID PULSE COMPRESSION SYSTEM

BACKGROUND OF THE INVENTION

Communication and radar systems frequently employ coded pulses for the transmission of data and employ receivers having filters matched to the coding. As is well known, such filters are utilized in radar for compressing a relatively long duration transmitted pulse signal into a relatively short duration signal but of increased amplitude. For maximum use of the available spectrum of transmission of the pulse signal, it is desirable to utilize a waveform modulation which uniformly distributes the spectral components of the waveform throughout the signal bandwidth, a desirable spectrum being one similar to the spectrum of noise wherein the spectral energies are uniformly distributed across the available bandwidth.

A problem arises in that signals may be transmitted between stations which are moving relative to each other, or may be reflecting from a target which is moving relative to a transmitter or receiver of the signal. Such motion induces a Doppler frequency shift which may so alter the signal that the filter in the receiver is no longer matched to the signal. In the past, it has been found that a signal modulation which is Doppler tolerant, in the sense that the receiving filter remains substantially matched to the signal in the presence of Doppler frequency shifts, has not had a distribution of spectral energies which is as uniformly distributed across the available transmission bandwidth as would be desired. On the other hand, signals having modulations which do provide the desired spectrum utilization have not been Doppler tolerant.

SUMMARY OF THE INVENTION

The aforementioned problem is overcome and other advantages are provided by a hybrid pulse compression system employing the generation and reception of a large bandwidth Doppler tolerant signal for use by communication and radar systems. In accordance with the invention, the hybrid pulse compression system utilizes a set of delay lines for generating the Doppler tolerant signal, the delay lines having taps thereon for producing discrete phase shifts on a carrier signal. The delay lines are coupled serially so that the phase modulation produced by one line is superposed upon the phase modulation produced by a second line of the set of lines. One delay line with relatively large delays between the taps thereon includes a set of phase shifters connected to each of the taps for producing phase shifts having magnitudes which bear a quadratic functional relationship to the delay time of the respective taps. Such quadratic phase shifts approximate the phase shift associated with a chirped or a linear sweeping of the frequency of a radar signal. A second one of the delay lines has relatively small delays between its taps, the taps having connections with the delay line producing inphase and out-of-phase (0° and 180° phase shift) signals in accordance with a predetermined code.

In a preferred embodiment of the invention, the first and second delay lines are fabricated from surface acoustic wave (SAW) devices. The coded pulse modulation of the second delay line reappears periodically throughout the duration of the quadratic phase shift pattern. A similar pair of delay lines and phase shifters are employed as a matched filter for receiving the signal and providing a pulse compression thereof. The quadratic phase shift pattern produces a tolerance to Doppler frequency shifts while the repeating code word modulation imparts a uniform distribution of spectral energies about the available transmission bandwidth.

BRIEF DESCRIPTION OF THE DRAWINGS

The aforementioned aspects and other features of the invention are explained in the following description taken in connection with the accompanying drawings wherein.

DESCRIPTION OF THE PREFERRED EMBODIMENT

Figure 1:
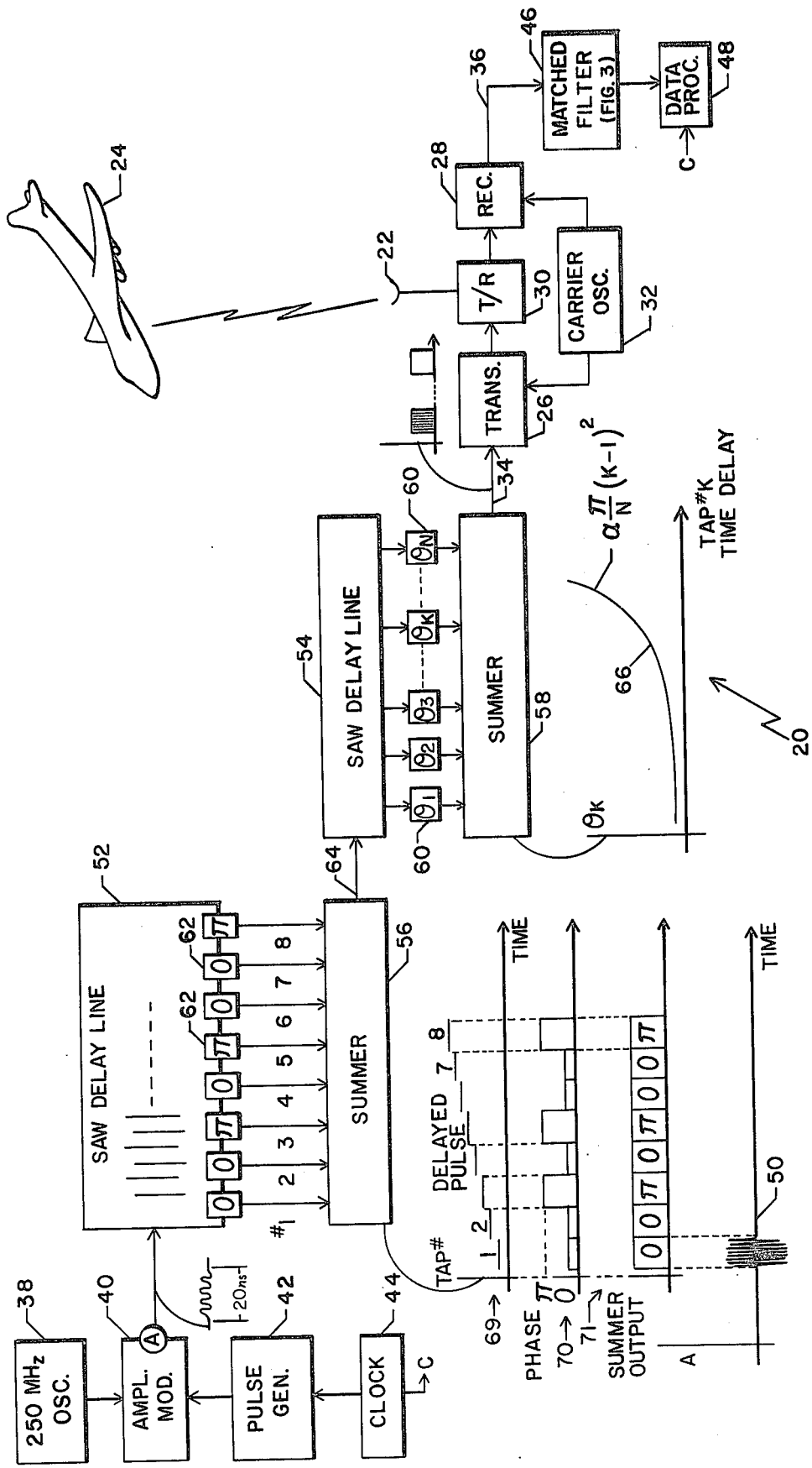
FIG. 1 is a block diagram of a signal generation and reception system in accordance with the invention including graphs of waveforms produced by two delay lines.
Figure 2:
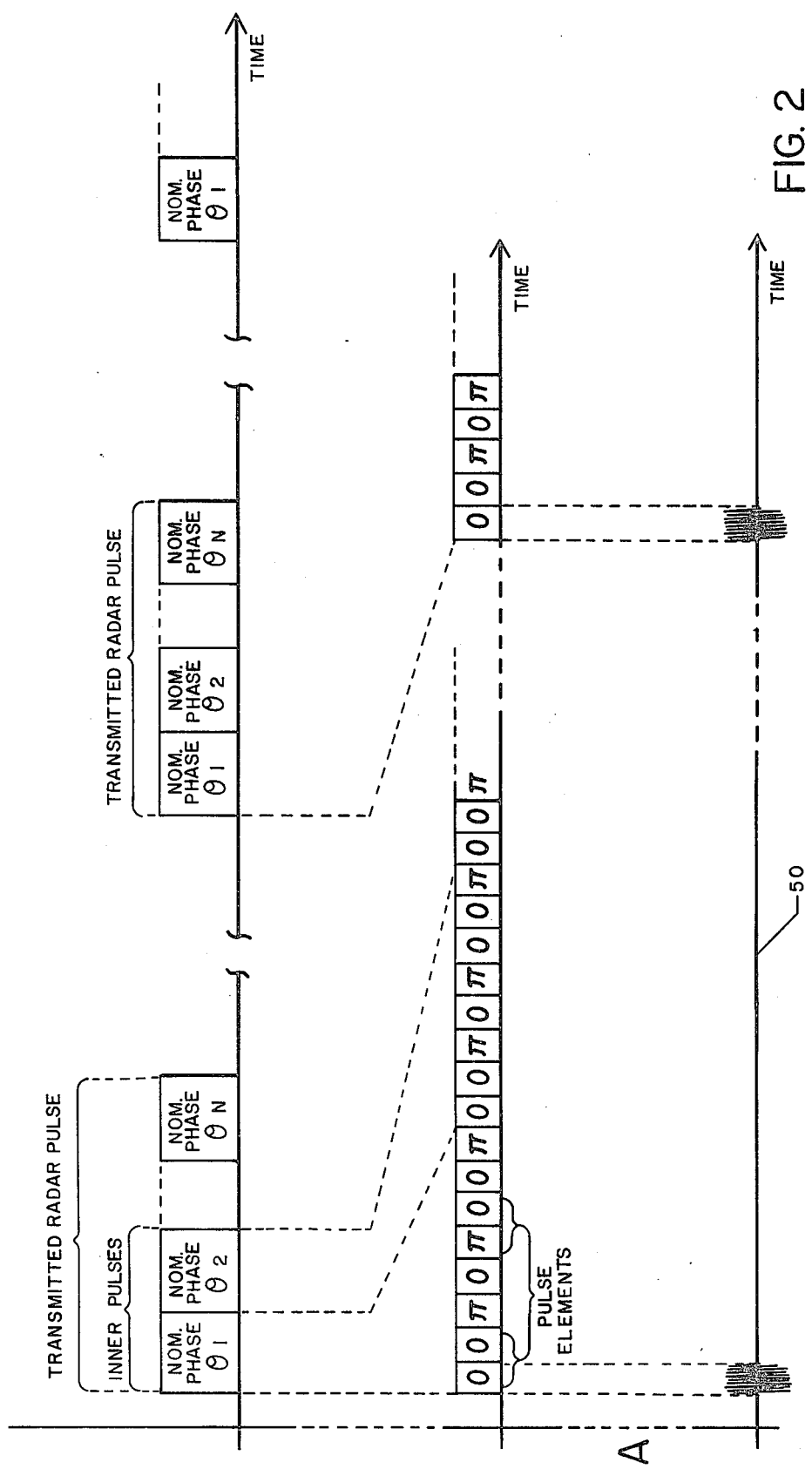
FIG. 2 is a timing diagram of a waveform generated by two delay lines of FIG. 1.

Referring now to FIGS. 1 and 2, a hybrid pulse compression system 20 of the invention is shown being utilized with a radar antenna 22 transmitting a radar signal toward an aircraft 24. A transmitter 26 and a receiver 28 are coupled via a transmit-receiver circuit 30 to the antenna 22, the transmitter transmitting the radar signal via the circuit 30 and the antenna 22 to the aircraft 24 while the receiver receives radar echoes from the aircraft 24 via the antenna 22 and the circuit 30. An oscillator 32 provides a carrier reference signal to the transmitter 26 whereby a signal on line 34 is modulated on a carrier, the oscillator 32 also providing a reference signal to the receiver 28 whereby the carrier is extracted from the receiver signal leaving a received signal at an intermediate frequency (IF) on line 36.

The system 20 further comprises an oscillator 38, a modulator 40, a pulse generator 42, a clock 44, a match filter 46 and a data processor 48. The oscillator 38 generates an IF sinusoidal signal which is applied to the modulator 40. The pulse generator 42, in response to clock pulse signals provided by the clock 44, applies a sequence of pulse signals to the modulator 40 which modulates the amplitude of the IF signal of the modulator 40 to produce a pulsed IF signal at terminal A of the modulator 40. By way of example, the oscillator 38 produces a sinusoid at a frequency of 250 megahertz (MHz) with a pulse width of 20 nanoseconds (ns) appearing at terminal A. A sequence of the pulsed IF signals at terminal A is seen in the graphs 50, one of the pulsed signals being utilized in the generation of each of the radar pulses appearing on line 34 for transmission by the transmitter 26 to the aircraft 24. The echoes received from the aircraft 24 are filtered by the filter 46, in an manner to be described with reference to FIG. 3, and then applied to a data processor 48 which, by way of example, may include ranging circuits responsive to timing signals from terminal C of the clock 44.

In accordance with the invention, the phase coding of the signal on line 34 and the quadratic phase shift function is accomplished by delay lines 52 and 54, summers 56 and 58, and a set of phase shifters 60 each of which produces differing amounts of phase shift while applying equal amounts of time delay to signals propagating therethrough. The signal at terminal A propagates through the delay line 52 and appears sequentially at each of its output terminals or taps 62 by which the signal is coupled to the summer 56. The delay between successive ones of the taps 62 is equal to the pulse width of the signal at terminal A. The signal produced by the summer 56 is coupled via line 64 to the delay line 54 through which the signal propagates to appear sequentially at each of the phase shifters 60 which, in turn, couple the signals to the summer 58. The summer 58 combines the signals in a manner to be described to produce the aforementioned pulse signal on line 34, the signal on line 34 having a duration which is much longer than the duration of the signal at terminal A.

The upper and middle graphs of FIG. 2 portray successive radar pulses to be transmitted, these radar pulses appearing on line 34 on FIG. 1. The upper graph of FIG. 2 shows that each radar pulse is composed of a sequence of inner pulses, each inner pulse having a nominal phase shift relative to the phase $\theta$ of the first phase shifter 60. For ease of reference, the first, second and Kth phase shifters correspond to the phase angles $\theta 1$, $\theta 2$, and $\theta k$ shown in FIG. 1. Thus, the first of the inner pulses has a phase angle as produced by the first phase shifter 60. Since the quadratic pattern in the phase shift is based on the relative shifts in phase with reference to the output signal of the first phase shifter 60, the output signal of the first phase shifter 60 may be taken as a reference point of zero phase. The actual amount of phase imparted by the first phase shifter 60 is purely a matter of convenience in design and, if desired, may be set equal to zero but, subject to the understanding that the circuit utilized in building the first phase shifter 60 must include a delay circuit for imparting a delay to signals propagating therethrough which is equal to the delay of each of the other phase shifters. Graph 66 of FIG. 1 shows a continuous curve approximating the step wise increments in phase of the signals incident upon the summer 58, the graph 66 being quadratic in terms of the parameter K for which integral values of the value K on the horizontal coordinate of the graph 66 correspond to the phase shifts produced by corresponding ones of the phase shifters 60.

The middle graph of FIG. 2 is an expanded view of the upper graph and shows that each of the inner pulses is composed of a set of pulse elements having phase shifts of 0 to $\pi$ radians (180°). The phases of the respective pulse elements are arranged in a pattern of a phase code which is repeated for each of the inner pulses. The phase shifts of the pulse elements are produced by the taps 62 of the delay line 52. By way of example, the delay line 52 is seen to have eight taps which are numbered consecutively in the figure, these eight taps being coupled to the summer 56. The graphs 69, 70 and 71 are in time registration with each other and describe the phases of the signals successively incident upon the summer 56 by each of the eight taps of the delay line 52. The graph 71 shows the same phase pattern as does the middle graph of FIG. 2. As seen in graph 69, the pulse signal at terminal A appears sequentially at each of the taps 62, there being equal increments of time delay between each of the taps 62. The graph 70 portrays the phase shifts of the individual pulse signals appearing at each of the taps 62 at the successive instances of time. It is noted that the duration of the pulse signal of terminal A is equal to the delay time between successive ones of the taps 62 so that, as shown in graph 71, each of these successive occurrences of the pulse signals at the respective taps 62 are contiguous to each other without overlapping. In view of the fact that no two signals of the taps 62 appear at the same time, the result of the summation of these signals by the summer 56 is a continum of contiguous pulse signals as shown in the graph 71, the phases of respective ones of these pulse elements assuming the discrete values portrayed in the graph 71.

In view of the linearity of the delay lines 52 and 54, of the phase shifters 60 and of the summers 56 and 58, the signal at terminal A may either be applied to the delay line 52 followed by the delay line 54 as shown in FIG. 1 or, alternately, the signal at terminal A may be applied first to the delay line 54 and then to the delay line 52. In both cases, a repetitive code is obtained among the pulse elements having the binary format portrayed in the graph 71 while the nominal phase of each inner pulse varies in the quadratic fashion of the graph 66 which, as seen in the figure, is proportional to the factor $\pi/N$ wherein N is the number of phase shifters 60 and the proportionality factor is less than or equal to unity. The quadratic term describing the graph 66 is expressed as a function of K-1 which represents the number of differences in phase accummulated at the time when a pulse signal appears at the Kth phase shifter 60.

Figure 3:
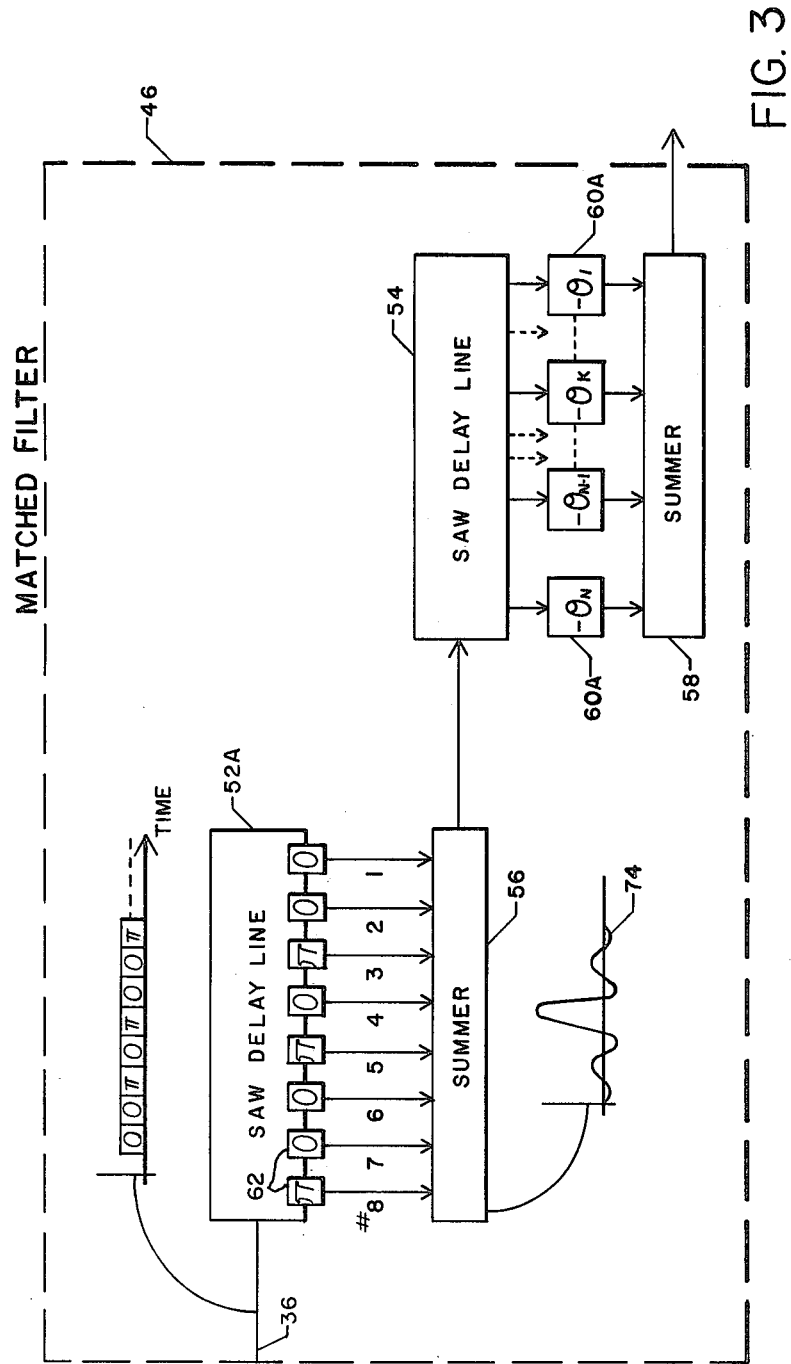
FIG. 3 is a block diagram of a matched filter of FIG. 1.

Referring now to FIG. 3, the matched filter 46 is seen to comprise two delay lines 52A and 54A, the summers 56 and 58 and a set of phase shifters 60A. The delay line 52A is similar to the delay line 52 but differs therefrom in that the taps 62 are arranged in reverse order. In addition, the phase shifts are the negative of the phase shifts produced by the delay line 52 of FIG. 1; however, since the negative of radians is equal to radians, the taps 62 are labeled in FIG. 3 with the same phase shifts as shown in FIG. 1. With respect to the delay line 54A, the signal is also applied to the line in the reverse direction so that the Nth phase shifter 60A appears at the first tap while the first phase shifter 60A appears at the last tap of the delay line 54A. In addition, each of the phase shifters 60A provides the negative of the value of phase of the corresponding phase shifter 60 of FIG. 1. The previous description of the summers 56 and 58 applies also to FIG. 3 and, in addition, due to the linearity of the delay lines 52A and 54A, the input signal to the matched filter 46 may be applied first to the delay line 54A and then to the delay line 52A. Accordingly, it can be seen that the summer 56, as is known from the design of transversal filters, develops a summation of the pulse elements of the middle graph of FIG. 2 as these elements appear successively at the taps 62 of the delay line 52A. The summation rises and falls in value depending on the correspondence of signal phase with the phases produced by each of the taps 62, a peak amplitude of the summation appearing when a complete set of pulse elements for one of the inner pulses fills the delay line 52A. In that case, the first pulse element is seen at tap #1, the second pulse element appears at tap #2, and similarly with the other pulse elements such that the eighth pulse element appears at the tap #8. A portrayal of the rising and falling magnitude of the summation produced by the summer 56 is portrayed in a stylized fashion in the graph 74, such a portrayal representing a compression of one of the inner pulses and being characteristic of a matched filter.

The summations of the summer 56 are applied to the line 54A wherein, in cooperation with the phase shifters 60A and the summer 58, there is again produced a summation of rising and falling values in the same manner as has just been described with reference to the delay line 52A. When an entire set of compressed inner pulses of one radar pulse of the upper graph of FIG. 2 is present in the delay line 54A, the nominal values of phase of each compressed inner pulse is in correspondence with the phase of the corresponding phase shifter 60A so that a peak value occurs in the summation of the summer 58. The peak value has a duration equal to the width of the pulse signal at terminal A of FIG. 1, this duration representing a great amount of compression of pulse width as compared to the width of the transmitted radar pulse on line 34 of FIG. 1 as portrayed in the upper graph of FIG. 2. The matched filter 46 is tolerant to shifts in the phase of received signals due to the Doppler frequency shift associated with movement with the aircraft 24. The frequency spectrum associated with the phase coding depicted in the lower graph of FIG. 2, which coding may be a Barker code or maximal-length shift register code or other code having a pseudorandom characteristic, provides a uniform distribution of energies of spectral components throughout the bandwidth of the transmitted radar signal on line 34, the resultant spectrum being noise-like in appearance.

It is understood that the above-described embodiment of the invention is illustrative only and that modifications thereof may occur to those skilled in the art. Accordingly, it is desired that this invention is not to be limited to the embodiments disclosed herein but is to be limited only as defined by the appended claims.

What is claimed is:

1. A pulse compression system comprising:
   a code generator and a code receiver, said code generator and said code receiver each comprising first and second tapped delay line means;
   said first delay line means having a total delay time equal to the delay time between successive taps of said second delay line means, the taps of said first delay line means imparting a phase code modulation to a pulsed signal incident upon said first delay line means and exiting sequentially via each of said taps of said first delay line means;
   means for summing together signals exiting from said successive taps of said first delay line means, said summing means being coupled to an input terminal of said second delay line means;
   said second delay line means including phase shifters at individual ones of the taps of said second delay line means for imparting phase shifts in accordance with a quadratic function of time delay between successive ones of said taps of said second delay line means; and
   summing means coupled to output terminals of said phase shifters of said second delay line means for summing together signals appearing sequentially at output terminals of said second delay line means.

2. A system according to claim 1 wherein the phases imparted by the phase shifters of said second delay line means of said receiving means are arranged in inverse order and with opposite sign to the phase shifts of the phase shifters of said second delay line means of said signal generation means.

3. A system according to claim 2 wherein said code modulation provided by said first delay line means is a binary phase code incorporating phase shifts of 180°.

4. A code generator for producing a coded signal suitable for compression by a filter matched to the coded signal, said generator comprising:
   means for generating a sequence of signal pulses differing in phase by shifts of 180°, said shift occurring sequentially in time in accordance with a code format;
   tapped delay line means having an input terminal coupled to said generating means, the delay between successive taps of said delay line means being equal to the temporal length of said sequence of signal pulses whereby said sequence appears repetitively at successive ones of said taps;
   a set of phase shifters of which individual phase shifters are coupled to respective ones of said taps for introducing amounts of phase shift which vary as a quadratic function of time delay between successive ones of said taps; and
   means coupled to said phase shifters for summing repetitively occurring sequences to produce said coded signal.

5. A filter for compressing a sequence of repetitively occurring phase coded signal wherein each repetition of the coded signal is phase shifted from the previous occurrence of the coded signal, said filter comprising:
   first tapped delay line means having an input terminal for receiving said coded signals;
   second tapped delay line means having a delay between successive taps thereof equal to the total delay of said first delay line means;
   first summing means having an output terminal coupled to an input terminal of said second delay line means;
   first phase shifting means, individual taps of said first delay line means being coupled via said first phase shifting means to input terminals of said first summing means, phase shifts of said first phase shifting means being imparted at said taps in reverse order to the phase coding of said sequence of coded signals;
   second phase shifting means; and
   second summing means, individual taps of said second delay line means being coupled via said second phase shifting means to input terminals of said second summing means, phase shifts of said second phase shifting means being imparted at the taps of said second delay line means in reverse order of said phase shifting of the repetitions of said phase coded signals.

* * * * *